United States Patent
Aldea Lopez

(10) Patent No.: US 10,949,378 B2
(45) Date of Patent: Mar. 16, 2021

(54) AUTOMATIC AND CUSTOMISABLE CHECKPOINTING

(71) Applicant: Fujitsu Limited, Kawasaki (JP)

(72) Inventor: Sergio Aldea Lopez, London (GB)

(73) Assignee: FUJITSU LIMITED, Kawasaki (JP)

( * ) Notice: Subject to any disclaimer, the term of this patent is extended or adjusted under 35 U.S.C. 154(b) by 371 days.

(21) Appl. No.: 15/454,651

(22) Filed: Mar. 9, 2017

(65) Prior Publication Data

US 2017/0344564 A1   Nov. 30, 2017

(30) Foreign Application Priority Data

May 31, 2016   (DE) .......................... 102016209491.2
May 31, 2016   (GB) ...................................... 1609530

(51) Int. Cl.
*G06F 16/00*   (2019.01)
*G06F 15/173*  (2006.01)
*G06F 11/14*   (2006.01)

(52) U.S. Cl.
CPC ........ *G06F 15/17331* (2013.01); *G06F 11/14* (2013.01); *G06F 11/1441* (2013.01); *G06F 11/1466* (2013.01)

(58) Field of Classification Search
CPC ............... G06F 11/203; G06F 2201/84; G06F 11/1438; G06F 11/2038; G06F 11/2097; G06F 11/1407; G06F 11/1469; G06F 11/1484; G06F 11/1658; G06F 11/2048; G06F 15/17331; G06F 16/178;

(Continued)

(56) References Cited

U.S. PATENT DOCUMENTS 6,718,538 B1   4/2004  Mathiske
7,330,861 B2 * 2/2008  Ninose ................ G06F 11/2064
                                                          707/648

(Continued)

FOREIGN PATENT DOCUMENTS

WO   WO 2012/130348 A1   10/2012
WO   WO 2013/101142 A1    7/2013

OTHER PUBLICATIONS

German Search Report dated Oct. 25, 2016 corresponding to German Patent Application No. 10 2016 209 491.2.

(Continued)

*Primary Examiner* — Yicun Wu
(74) *Attorney, Agent, or Firm* — Staas & Halsey LLP

(57) ABSTRACT

A checkpointing mechanism by which in-memory data structures are copied from computation nodes (200) to staging nodes (700) by using RDMA, checkpoints are made and kept in memory in the staging node (700), and then asynchronously copied to non-volatile storage (150). In contrast to previous approaches, checkpoints remain in volatile memory (740) as part of the checkpointing mechanism. As a result, recovery from checkpoint is potentially faster, since the required checkpoint may be already in memory (740) in the staging node (700). An automatic and customisable mechanism is provided to control when the checkpointing process is triggered. As an alternative to copying an object through the network, the object in memory can be updated to a newer version of the object by applying the chain of changes made in the object in the corresponding computation node (200).

15 Claims, 7 Drawing Sheets

(58) Field of Classification Search
CPC ............. G06F 16/183; G06F 2201/815; G06F 11/1446; G06F 11/2043; G06F 2201/825; G06F 2209/509; G06F 9/3009; G06F 9/3863; G06F 9/3877; G06F 9/4856; G06F 11/108; G06F 2003/0692; G06F 2211/1028; G06F 3/0601; G06F 11/1471; G06F 11/2046; G06F 11/2074; G06F 11/2087; G06F 15/167; G06F 15/177; G06F 16/00; G06F 16/10; G06F 16/1847; G06F 17/5022; G06F 2217/02; G06F 3/0613; G06F 3/0635; G06F 3/067
See application file for complete search history.

(56) References Cited

U.S. PATENT DOCUMENTS

| | | | | |
|---|---|---|---|---|
| 7,437,389 | B2 * | 10/2008 | Iwamura | G06F 11/2071 |
| 7,457,822 | B1 * | 11/2008 | Barrall | G06F 16/128 |
| 9,158,540 | B1 * | 10/2015 | Tzelnic | G06F 11/108 |
| 9,213,609 | B2 * | 12/2015 | Hansen | G06F 11/2097 |
| 9,286,261 | B1 * | 3/2016 | Tzelnic | G06F 16/1847 |
| 2008/0046644 | A1 | 2/2008 | De Spiegeleer | |
| 2012/0222034 | A1 * | 8/2012 | Ishikawa | G06F 11/1438 718/102 |
| 2014/0214770 | A1 | 7/2014 | Kannan et al. | |
| 2015/0012776 | A1 * | 1/2015 | Banikazemi | G06F 11/1658 714/6.31 |

OTHER PUBLICATIONS

British Search Report dated Nov. 8, 2016 corresponding to British Patent Application No. 1609530.9.

Xiangyong Ouyang, "Efficient Storage Middleware Design in InfiniBand Clusters for High End Computing", 2012, Ohio, USA, pp. cover, i-xvii, 1-141.

Kento Sato et al., "Design and Modeling of a Non-blocking Checkpointing System", IEEE, Nov. 10-16, 2012, Salt Lake City, Utah, USA, pp. 1-10.

Ramya Prabhakar et al., "Provisioning a Multi-Tiered Data Staging Area for Extreme-Scale Machines", 2011 $31^{st}$ International Conference on Distributed Computing Systems, IEEE computing society, IEEE, 2011, pp. 1-12.

Kento Sato, "Extreme-Scale Resilience for Billion-Way of Parallelism", SC14 Workshop: ATIP Workshop on Japanese Research Toward Next-Generation Extreme Computing, Lawrence Livermore National Laboratory, Nov. 17, 2014, 24 pages.

Xiangyu Dong et al., "A Case Study of Incremental and Background Hybrid In-Memory Checkpointing", 2010, pp. 1-8.

Hasan Abbasl et al., "DataStager: Scalable Data Staging Services for Petascale Applications", Association for Computing Machinery, Jun. 11-13, 2009, Munich, Germany, pp. 39-48.

Xiangyong Ouyang et al., "Enhancing Checkpoint Performance with Staging IO & SSD", IEEE, May 3, 2010, Ohio, USA, pp. 1-29.

James S. Plank et al., "Faster Checkpointing with N + 1 Parity", University of Tennessee Technical Report CS-93-219, FTCS-24, Dec. 1993, pp. 1-15.

Gengbin Zheng et al., "FTC-Charm++: An In-Memory Checkpoint-Based Fault Tolerant Runtime for Charm++ and MPI", IEEE International Conference on Cluster Computing, Sep. 20-23, 2004, Illinois, USA, pp. 1-11.

Matei Zaharia et al., "Resilient Distributed Datasets: A Fault-Tolerant Abstraction for In-Memory Cluster Computing", $9^{th}$ USENIX Symposium on Networked Systems Design and Implementation, Apr. 25-27, 2012, California, USA, pp. 1-14.

* cited by examiner

AUTOMATIC AND CUSTOMISABLE CHECKPOINTING

CROSS-REFERENCE TO RELATED APPLICATIONS

This application claims the benefit of United Kingdom Application No. 1609530.9, filed May 31, 2016, in the United Kingdom Intellectual Property Office and German Application No. 102016209491.2, filed May 31, 2016, in the German Patent and Trademark Office, the disclosures of which are incorporated herein by reference.

FIELD

The embodiments relate to checkpointing which is a technique employed to improve fault-tolerance of applications executed by computer systems.

BACKGROUND

Computer systems are not exempt from unexpected failures, and in any case require periodic shutdowns for maintenance. This has led to a proliferation of different fault-tolerance techniques with the aim of avoiding either the loss of data, or the need to re-compute complex and long processes. One of the most common techniques consists of making a checkpoint of the state of said processes, or the data structures used by these processes, by saving them to reliable storage (conventionally, disk-based). This allows later restarting of the execution of the processes or restoring the values of those data structures. Although necessary to avoid loss of data, checkpointing mechanisms typically incur bottlenecks because they usually involve I/O operations to disk. For this reason, multiple approaches have been put forward in order to improve these mechanisms, from diskless to multi-level checkpointing.

For many years, main efforts in developing checkpointing techniques were focused on scientific applications, and therefore, how to checkpoint and restart processes, often executed in parallel and running for hours or days at a time. Although there is still room for improvement, years of research and innovation have crafted efficient and reliable mechanisms in this area.

On the other hand, as we come close to a world dominated by sensors, wearable devices, IoT, etc., all of them contributors to a Big Data ecosystem, the amount of data generated and handled by many applications is enormous. As a consequence of its volume, movements of data are very costly. Fault-tolerant mechanisms specially designed to deal with these requirements have been developed. Among those, Spark, with its in-memory Resilient Distributed Datasets (RDD), has had a major impact.

A Spark application consists of a driver program which executes various parallel operations on a cluster of nodes. The RDD is a collection of elements partitioned across the nodes of the cluster, and that can be operated on in parallel. A scheduling component of Spark (task scheduler) divides tasks into stages which can be executed by the available resources, taking into account the needs of other users of the cluster. RDDs can only be created through deterministic operations—called "transformations"—on either data in stable storage or other RDDs. These transformations (e.g., map, filter and join) apply the same operation to many data items. This allows RDDs to efficiently provide fault tolerance by logging the transformations used to build a dataset (its lineage) rather than the actual data. If a partition of an RDD is lost, the RDD has enough information about how it was derived from other RDDs to re-compute just that partition. Thus, lost data can be recovered, often quite quickly, without requiring costly replication. Despite being limited to coarse-grained transformations, RDDs are a good fit for many parallel applications, where the same operations are applied to multiple data items.

FIG. 1 shows a typical checkpointing mechanism used to save the state of an in-memory object or data structure (henceforth referred to simply as an object). The basic arrangement is that to execute an application, an input dataset is processed in a sequence of operations or "transformations" in accordance with code of the application, producing an output dataset as final result. The transformations together form a "lineage computation chain".

As shown in FIG. 1, the input dataset for use in executing an application is read from a file store 11 such as a Parallel File System (PFS) and, as part of the application, a first transformation (Transformation #1 or t1) is applied to produce a first object 31 (Object #1) which exists in a volatile memory 21 (part of a computation node of the computer system on which the application is executed). Next, a transformation t2 is applied which changes the object to a new or modified object 32 (Object #2) in volatile memory 22, which memory may belong to a different computation node and thus may be different from memory 21. The process is repeated by applying subsequent transformations t3 and t4. The final object 34 (Object #4), which is created in volatile memory 23, is written to a file store 12 (which may of course be the same as file store 11) to produce the output dataset as the final result of executing the application.

The checkpointing comes in upon creation of object 33 (Object #3) following transformation t3. As indicated by the downward arrow, the object is not merely retained in a computation node's volatile memory but instead stored in a file store 15 (which may be the same as file store 11 or 12). Then, even if there is a fault, for example loss of data from memory 23, the stored object can be retrieved from the file store and processing can resume starting with transformation t4, without having to start all over again with t1. As noted in FIG. 1, each checkpoint increases safety in terms of the ability to recover from faults, but at the cost of causing bottlenecks due to relatively slow disk writing times.

Spark, and other in-memory approaches, can reduce such bottlenecks thanks to the above mentioned technique of re-computation of objects based on their lineage computation chain. In this way, as an alternative to writing objects to disk for later retrieval, if a fault happens lost objects can be re-computed by applying the same operations as were recorded in a log. However, when long lineage computation chains are required to produce a certain object, it is worth keeping a copy of the object itself in order to avoid long computation times. This approach is followed by Spark, which increases the safety of data, but incurs bottlenecks due to the writes to disk.

In order to eliminate these bottlenecks, diskless approaches are proposed. Instead of checkpointing to stable storage, these approaches rely on memory and processor redundancy. Although this technique is faster and allows faster recoveries, it does not scale well to large number of processors, and is less secure than disk-based approaches.

This issue is addressed by hybrid mechanisms, which make the checkpoints over different levels, combining the speed of volatile storage with the security of non-volatile, stable storage. These approaches generally combine a dual local-global approach, making local and global copies in a distributed environment. However, these techniques cause three bottlenecks: (1) copies in distributed nodes are written into non-volatile, slower storage, (2) communicating checkpoints through the network is costly, and (3) global server or storage may be saturated by many simultaneous local nodes transferring copies.

In order to solve the last bottleneck, staging nodes are often used as an intermediate layer to coordinate the writes to the distributed, parallel file system (PFS) used to back up the checkpoints. Generally, these techniques use Remote Direct Memory Access (RDMA) to speed up communications between client and server nodes.

FIG. 2 shows the general principle of RDMA communication (not specifically in the context of checkpointing), in which data is transferred from one memory 24 in one node to a memory 25 in another node without involving a Central Processing Unit (CPU) 26 or 27 of either node, or caches or context switches. RDMA instead relies on respective network adapters 51 and 52 of the nodes to read and write data directly. Effectively, the network adapter 52 in the second node pulls the data from the memory 24 over a network 60 with assistance of network adapter 51, and places the data directly in memory 25 without the need for caching, and without the respective CPUs even being aware that this has occurred. This reduces latency and increases the speed of data transfer, which is obviously beneficial in high performance computing.

Consequently, references in this specification to data being transferred from one computer or node to another should be understood to mean that the respective network adapters (or equivalent) transfer data, without necessarily involving the CPU of each computer or node.

The current amount of data that is being handled in many fields, from science to finance, together with its importance and significance, make the implementation of secure and fast fault recovery systems absolutely crucial. In particular, current Big Data technologies, which help us to deal with the plethora of data we are generating, have to consider the implementation of these fault recovery systems.

SUMMARY

Although the above-mentioned approaches improve the performance of checkpointing processes, they do not contemplate the use of volatile storages in staging nodes, as a way of speeding up the recovery process, neither do they offer enough flexibility for using different techniques to checkpointing such as lineage-based recovery, nor do they include mechanisms to make required checkpoints when necessary automatically. The embodiments have been devised to address these problems.

According to a first aspect, there is provided a method of checkpointing a data object in a computer system having a computation node, a staging node and access to a file store, the method comprising:

duplicating, in a memory of the staging node, an object in a memory of the computation node;
copying the object from the memory of the computation node to the file store; and
retaining the object in the memory of the staging node after copying the object to the file store.

In the above, "data object" or "object" denotes a data structure created or modified by the computation node, usually as part of an application being executed by the computer system. "Checkpointing" refers to the process of saving data objects during the course of computations performed by the computer system, forming a checkpoint from which computations can be restarted in the event of a failure.

The term "memory" denotes some form of fast storage, typically but not necessarily exclusively a solid-state memory such as random-access memory (RAM). The memory will usually be volatile memory (and may be part of the computation node or staging node itself, or an assigned area of a global memory in the computer system). The "file store" denotes a non-volatile memory such as a set of hard disks (and may be remote from the computer system itself, and/or distributed). It is referred to elsewhere also as "disk" or "Parallel File System (PFS)".

In contrast to previously-proposed approaches, the embodiments use the memory of a staging node not only as a temporary storage merely for transferring objects to the file store, but also as a fast-accessible checkpoint in its own right, thus exploiting the speed advantage of memory (e.g. RAM) over disk accesses. This apparently small difference leads to significant changes in how the checkpointing process is handled.

The "duplicating" referred to above may comprise copying the object from the memory of the computation node to the memory of the staging node. Preferably, such copying is performed using Remote Direct Memory Access, RDMA.

Alternatively, duplicating the object is performed by updating the object already present in the staging node. This is done by, in the staging node, applying one or more transformations to the object retained in the memory of the staging node to replicate changes made to the object in the computation node. In other words the lineage computation chain is applied instead of copying the whole object over again.

In view of these alternative possibilities for duplicating the object, there is preferably added a step of, prior to duplicating the object, selecting whether to duplicate the object by copying it from the computation node or by updating the object in the staging node.

Such selecting (which can be decided in the staging node itself without the need for manual intervention) may be performed by calculating whether the staging node applying said one or more transformations to the object is quicker than reading the object from the memory of the computation node.

In any case, checkpointing needs to be triggered in some way. Preferably, checkpointing is performed on a per-computation node basis and triggered by the computation node without the need for manual intervention. Thus, the method preferably includes an initial step of the computation node sending object attributes to the staging node. Receipt of object attributes can be taken as an implicit request to checkpoint the object (or alternatively may be accompanied by an explicit checkpointing request).

Automatic checkpointing in the above manner can be customised by a user. Accordingly, the method may further comprise the user setting conditions under which the computation node decides to checkpoint an object, including any one or more of:

computation time of the object,
priority of the object, and
usage frequency of the object.

Preferably, the method further comprises the staging node receiving the object attributes from the computation node and, based on the object attributes, selecting whether to copy the object from the computation node or to update the object in the staging node.

Although only one computation node and one staging node were mentioned above, in practice the computer system will have many computation nodes and a plurality of staging nodes. For reasons of economy, the number of staging nodes may be much less than the number of computation nodes, leading to a potential problem of memory capacity in the staging node. For this reason, preferably, the method further includes the staging node judging, prior to the duplicating, whether sufficient space for the object exists in the memory of the staging node and if not, creating space in the memory.

This can be done by releasing one or more objects previously duplicated in the memory of the staging node but which have already been transferred to the file store.

The copying from the computation node to the staging node can be carried out synchronously or asynchronously. Synchronous copying is preferable since the copying takes place at the time of checkpointing, and must be completed quickly since computation in the computation node is interrupted until the copying has finished. Likewise, copying of the object from the staging node to the file store can be performed either synchronously or asynchronously. Asynchronous copying is preferable in this case, as writing to the file store is relatively slow, but the computation node can continue with its computation without interruption.

Holding objects in staging nodes and file store is, of course, only one stage of checkpointing. Another is to make use of checkpointed objects to recover from a fault, or to re-start after a planned shutdown. Accordingly, the method may further comprise, upon occurrence of a fault in the computation node, restoring the object from the memory of the staging node to the memory of the computation node. If the object is not still retained in the staging node (for example due to being released to make space for another object), the object can be retrieved from the file store.

According to a second aspect, there is provided a computer system comprising:
  a plurality of computation nodes for processing objects;
  a plurality of staging nodes, each staging node assigned to one or more of the computation nodes;
  a network for exchanging data including objects between the computation nodes and the staging nodes and accessing a file store; wherein
  a said staging node is arranged to:
    duplicate in a memory of the staging node an object which exists in a memory of a computation node to which the staging node is assigned;
    copy the object from the memory of the computation node to the file store; and
    retain the object in the memory of the staging node after copying the object to the file store.

The above system may, of course, provide any of the features mentioned above with respect to the method.

According to a third aspect, there is provided a computer program containing computer-readable instructions which, when executed by a computation node and/or a staging node in a computer system, perform any method as defined above.

Such a computer program may be provided in the form of one or more non-transitive computer-readable recording media, or as a downloadable signal, or in any other form.

Thus, embodiments provide an automatic and customisable RDMA-based checkpointing mechanism for in-memory data structures (objects) that combines memory and disk, whilst reducing the load of the computation nodes with the use of staging nodes. The proposed mechanism is able, under certain customisable conditions, to trigger the process to make a checkpoint of a certain in-memory data structure. Moreover, embodiments keep in-memory checkpoints in the staging nodes to allow faster recovery when faults happen, whilst checkpoints are also distributed over a parallel file system (PFS) to increase data safety. This hybrid approach combines memory and disk checkpointing, while communicating data through RDMA connections to reduce bottlenecks. Finally, embodiments are able to decide when it is not worth copying all the data to make a new checkpoint, and instead apply an incremental checkpointing based on the lineage computation chain of the in-memory data structure, hence reducing communication between nodes.

Embodiments can address the issues identified in the above section as follows.

(a) Bottlenecks occur when checkpointing data from memory to disk. In embodiments, data is not copied from memory to disk, but from memory to memory through a RDMA mechanism.

(b) Checkpointing copies in distributed nodes are written into non-volatile, slower storage. In embodiments, staging nodes are used not only as an intermediate layer through the file store (PFS) in which checkpoints are stored into a non-volatile storage, but also as nodes whose memories (fast, usually volatile, storage) are used as an in-memory checkpointing area.

(c) Communicating checkpoints through the network is costly. In embodiments, communications over the network are done by using RDMA, which is a faster way of communicating between nodes, since transfers go from memory to memory directly, without involving the operating system or the CPU. Moreover, embodiments can reduce the amount of communications required, by only transferring the lineage of an object to update the corresponding checkpoint.

(d) A global server or storage in a computer system may be saturated by many simultaneous local nodes transferring copies. Embodiments make use of staging nodes to coordinate the copies from the computation nodes to the PFS, while using the same staging nodes as in-memory checkpointing areas.

(e) Previous checkpointing techniques do not contemplate the use of volatile storage in the staging nodes as a way of speeding up the recovery process. As mentioned in (b), the embodiments employ staging nodes in a novel manner by retaining objects in memory even after transfer to the file store, to support a hybrid checkpointing mechanism.

(f) Previous checkpointing techniques do not offer enough flexibility for using different techniques to checkpointing such as lineage-based recovery. Embodiments decide when it is not worth it to copy all the data regarding a new checkpoint, and instead apply an incremental checkpointing based on the lineage computation chain of the in-memory data structure (object), hence reducing communication between nodes.

(g) Previous checkpointing techniques do not include mechanisms to make required checkpoints when necessary automatically. Embodiments can, under certain conditions, automatically trigger the process to make a checkpoint of a certain in-memory data structure. Moreover, those conditions are customisable by the user, so it is possible to change the behaviour of the described automatic mechanism.

BRIEF DESCRIPTION OF THE DRAWINGS

Reference is made, by way of example only, to the accompanying drawings in which.

DETAILED DESCRIPTION

Before describing embodiments it may be helpful to list some technical terms to be used in the subsequent description, as follows.

HPC: High Performance Computing.

RDMA: Remote Direct Memory Access. This allows data to be transferred from one memory in one node to the memory in another node without involving a CPU, caches or context switches, because data is copied by the nodes' network adapters.

Node: A hardware resource in a computer system including at least a processor, or possibly a complete computer which is part of a networked computer system. The node may have its own local memory, or may have an assigned area in a global memory of the computer system.

Computation node: Node in which the computation is performed.

Staging node: An intermediate node that facilitates communications from the computation nodes and the file system used for backup, or checkpointing storage.

Checkpointing: A technique to add fault tolerance into computing systems, which consists of saving a snapshot of the application's state. In data-driven applications, a checkpoint can be made by only saving the state of a certain data structure (object) in a certain moment of time.

Hybrid checkpointing: The combination of non-volatile (such as HDD) and volatile storage (such as RAM) to provide the checkpointing mechanism.

Object: A data structure which is used in, or is generated by an application to be checkpointed.

Lineage computation chain: A technique by which, when a fault happens, lost objects can be re-computed by applying the same chain of operations as were recorded in a log.

PFS: Parallel File System: a file store for long-term storage of objects and other data, programs etc. Typically disk-based, and may be remote from the computer system itself (and possibly in "the cloud").

User: A human user, who may influence the decision to checkpoint an object, either by manually coding checkpoints during development of the application, or by adjusting parameters for allowing the system to perform checkpointing automatically.

Figure 2:
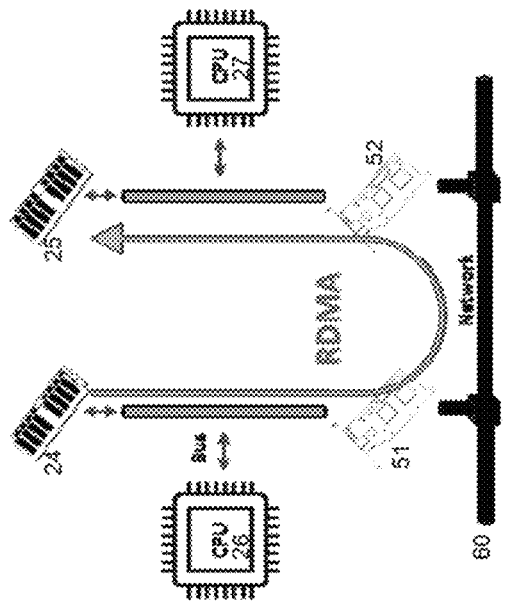
FIG. 2 shows conventional Remote Direct Memory Access (RDMA)

Embodiments provide an automatic mechanism to perform hybrid (using both memory and disk storage) checkpoints of in-memory data structures (hereinafter called objects). Communications of these objects are done by using RDMA, in a manner similar to that shown in FIG. 2, which differs from the approach followed by other alternatives, such as Spark, because checkpoints are made from memory to memory, instead of copying the object from memory to a slower, non-volatile storage. Following this approach, embodiments eliminate the bottlenecks involved in the writes to disk, and hence, improve the performance of the checkpointing mechanism. As will be later explained, writes to the non-volatile storage are delayed and performed in the staging nodes, with no impact on the performance of the computation nodes.

Figure 1:
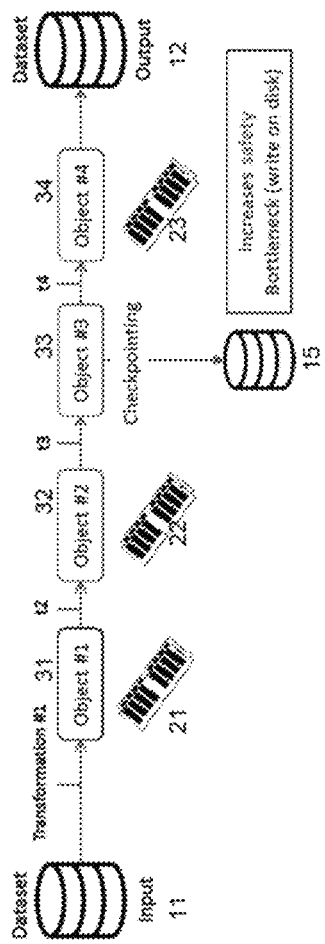
FIG. 1 shows a conventional checkpointing mechanism.
Figure 3:
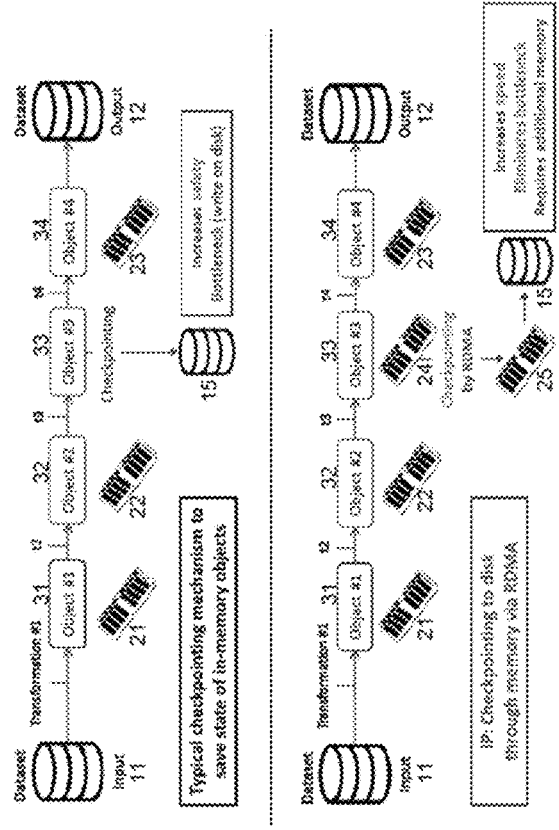
FIG. 3 compares the conventional checkpointing mechanism of FIG. 1 with a checkpointing mechanism employed in embodiments.

FIG. 3 shows a comparison between the typical checkpointing mechanism and the proposed RDMA-based technique to eliminate the bottleneck in the writes to disk of in-memory checkpointing mechanisms. The upper half of the Figure depicts the conventional checkpointing mechanism as already described with respect to FIG. 1.

The lower part of FIG. 3 depicts the approach taken in the embodiments. As before, an input dataset 11 includes data structures which are subject to successive transformations to create objects 31, 32 and 33 etc. The difference is at the stage where object 33 has been created and is to be checkpointed. Instead of directly writing this object to file store 15 as in the conventional approach, RDMA is used to pull the object from a memory 24 of the node which created the object to a memory 25 in a staging node (described later in more detail). From there, the object is transferred asynchronously to the file store 15. The result is to increase speed and eliminate the bottleneck, at the cost of the additional hardware (in particular, memory) needed for the staging node. Although such use of staging nodes is known per se as noted above, there is more to their use in the embodiments as will become apparent.

Figure 4:
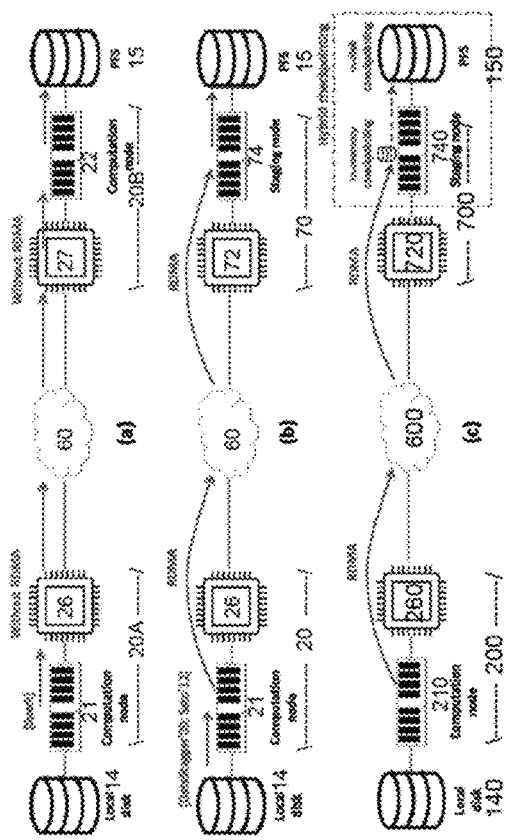
FIGS. 4(a) to (c) compare (a) a conventional checkpointing mechanism without RDMA; (b) a proposed checkpointing mechanism with RDMA and (c) a checkpointing mechanism as used by embodiments.

FIG. 4 indicates how the use of staging nodes differs between the embodiments and previously-proposed approaches. FIG. 4(a) shows the Spark-based approach, FIG. 4(b) uses staging nodes in a previously-proposed way, and FIG. 4(c) shows the novel approach taken in the embodiments. In each case, a network 60 or 600 connects computation nodes 20, 20A, 20B or 200 with each other and with staging nodes 70 or 700, e.g. as part of a large-scale computer system.

Spark's approach is shown in FIG. 4(a). Derived by processing data from a local disk 14 in a CPU 26, an in-memory object within memory 21 of computation node 20A is transferred to another computation node 20B having a CPU 27 and memory 22 without using RDMA, to be distributed, replicated and stored (usually using HDFS: Hadoop Distributed File System). As writes to disk (PFS 15) are done in the computation nodes, a certain loss of performance is produced. It Is not possible to use RDMA communications with Spark, because it is not designed to do that: the semantics of Spark's commands do not include any provision for RDMA communications.

FIG. 4(b) shows a different approach, which has the aim of eliminating disk bottlenecks in the computation nodes by introducing staging nodes 70, as well as improving the communication via RDMA connections (as denoted by the curved arrows bypassing CPUs 26 and 72). That is, an object can be directly transferred by RDMA from memory 21 of computation node 20 to memory 74 of staging node 70 having CPU 72, and from there asynchronously transferred to file store 15

Although this approach effectively improves the performance, it should be noted that in the known approach the memory 74 in the staging node 70 is only used as a buffer to write to the PFS 15: in other words the object is released (lost from memory 74) once the transfer is completed.

By contrast, as indicated in FIG. 4(*c*) the embodiments improve on previous approaches by retaining objects in the staging node memory 740 (volatile storage) as part of the checkpointing mechanism. As a result, recovery from checkpoint is potentially faster, since the required checkpoint may be already in memory in the staging node. That is, in FIG. 4(*c*), RDMA is again used to transfer the object from computation node memory 210 via network 600 to staging node memory 740 but in this case, instead of the memory 740 merely acting as a buffer for writes to the PFS 150, the staging node memory 740 becomes an in-memory checkpointing area.

Figure 5:
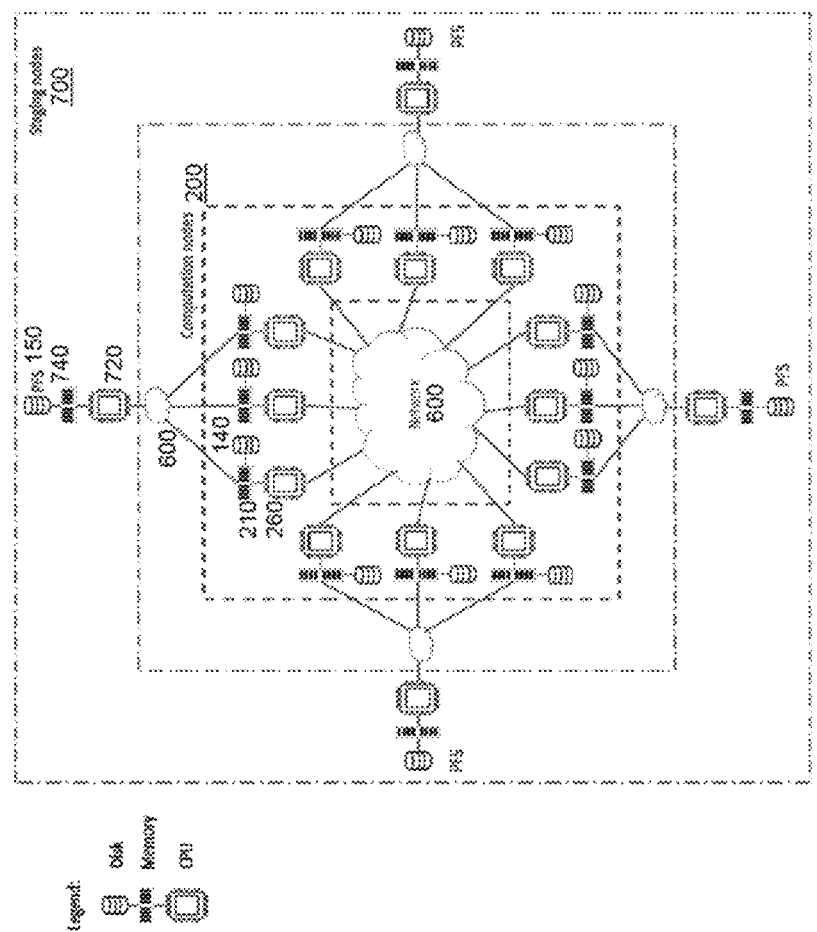
FIG. 5 shows a multi-level system architecture used in an embodiment.

Whilst FIG. 4 shows only individual computation nodes and staging nodes, of course in practice a computer system may have very many computation nodes and many staging nodes. FIG. 5 shows, as a simplified example, a multi-level system architecture proposed in embodiments. Computation nodes 200 are the nodes in which the computation tasks are performed, and the in-memory objects are generated. The nodes may be regarded as forming a "cluster" in the sense used by Spark for example. Computation tasks refer to both the above mentioned transformations of in-memory objects, and other computer instructions that build the logic of a program being executed in the computation nodes. Not every computer instruction in a program is involved in a transformation of in-memory objects.

Each node may be regarded as having (at least notionally) its own memory 210 and CPU 260, and access to a local file system 140. Some hardware resources may be shared among computation nodes if desired. The computation nodes are mutually connected by a network 600, for example a high-speed local-area network (LAN) or possible a wide-area network (WAN) including the Internet.

For every n computation nodes 200, there is a staging node 700, each comprising a CPU 720 and local memory 740 and having access to the PFS 150 for checkpointing purposes. Each staging node 700 is responsible for receiving the checkpoints from the computation nodes that it has assigned, keeping those checkpoints in memory and transferring them to the PFS 150. In contrast to previously-proposed approaches, it is important to note that the data is retained in the memory 740 of the staging node 700, and not merely stored for RDMA purposes. Thus, a difference over previous proposals is how memory is being used to exploit its speed advantage over disk accesses.

Incidentally, it is assumed that each object is handled by one computation node only, so that each one of them could apply a different transformation to the object. However; each computation node can handle different objects, even concurrently, since current multi core architectures allow us to process computer instructions in parallel. Also, the same node may perform different transformations upon the same object at different stages of execution.

As will be understood, the 3:1 relationship shown in FIG. 5 is a simplification. The actual ratio (which may be much larger, e.g. 100:1 or more) should be determined for each implementation, depending on the technologies used, as well as other factors. Thus, the ratio "n" of computation nodes per staging node is not fixed, and can be changed when the architecture is implemented. Depending on the characteristics of each particular computation process, the ratio could change with the aim of making the checkpointing process more efficient.

The hardware resources available may differ between computation nodes 200 and staging nodes 700. Generally, computation nodes should have more resources, while the priority for the staging nodes should be memory capabilities, i.e. memory size, low latency, etc.

The staging nodes 700 are preferably located as close as possible to the computation nodes 200 for speed of access. In some implementations, the computation nodes and staging nodes may all be processors, CPUs, cores or system boards of the same kind, some being assigned as computation nodes and some assigned as staging nodes. Such an arrangement allows the number of staging nodes, relative to that of the computation nodes, to be varied as required. Although not preferable from a speed viewpoint, under some circumstances it may be possible for the same hardware to provide both a computation node and a staging node.

Figure 6:
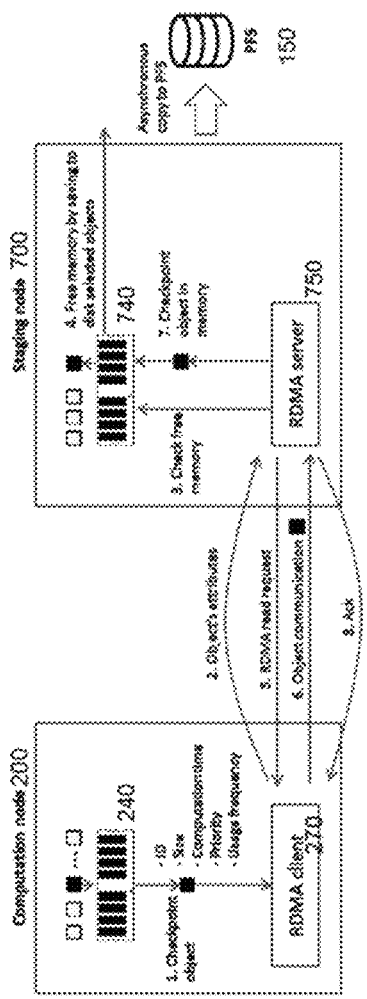
FIG. 6 shows a sequence of steps in checkpointing an object by copying the object.

The checkpointing mechanism proposed by embodiments implements RDMA clients 270 in each computation node 200, and RDMA servers 750 in the corresponding staging nodes 700. FIG. 6 describes the process followed by the proposed mechanism to achieve the checkpointing of a single object.

When a checkpointing action is initialized (explained later with reference to FIG. 10), the object being checkpointed is read by the RDMA client 270 (Step 1) in the computation node 200, which sends the object's attributes to the RDMA server 750 in the staging node (Step 2).

With this information, the RDMA server 750 located in the staging node can check if there is enough memory for the new object being checkpointed (Step 3). If not, the server 750 moves as many objects as necessary to the PFS 150 (Step 4), freeing enough memory for the new object. As will be understood, the objects being moved from memory to disk are the result of earlier checkpoints, since the staging node does not delete them from memory until necessary. The actual selection of objects being moved is based on a combination of factors, including the priority of the object, how often the object has been used, and the time required for computing that object. This calculation tries to maximize the likelihood of having a certain object in memory if a fault involving that object occurs.

Once the required memory space is available, the RDMA server 750 sends an RDMA read request (Step 5) to the RDMA client 270, which responds at Step 6 with the object to be checkpointed. This object is then checkpointed in memory (Step 7), and the server 750 sends an acknowledgment to the client 270. Finally, objects in memory 740 are asynchronously copied to the PFS 150, as a way of increasing security of the checkpointing mechanism in case of a failure of the staging node.

Note that if several computation nodes corresponding to a staging node initiate the checkpointing process concurrently, their requests are served following a FIFO (First In First Out) policy: the first node to request the checkpoint is the first to be heard.

Figure 7:
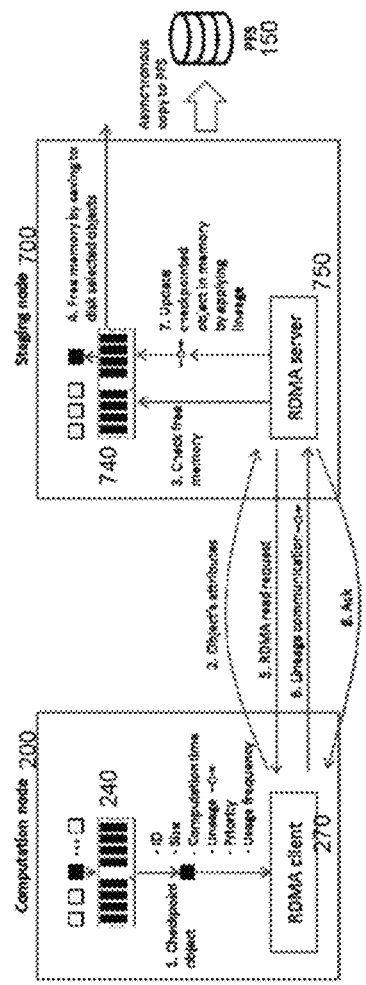
FIG. 7 shows a sequence of steps in lineage-based updating of an object.

Regarding Step 2 above, each object has the following attributes that help in the checkpointing process:
   an ID: a unique identifier for each object
   the size of the object in memory
   the computation time required to reach the current state of the object in memory (since last checkpoint)
   priority: a user-defined attribute set by the user to make the object less likely of being removed from the in-memory checkpointing storage.
   usage frequency: how often the object has been used since it was created, where "used" means that some or all of the values encoded in the object are read for the program purposes. It should be noted that such reads are distinct from transformations, which involve a modification of the object, and hence, a writing to It.

lineage computation chain: of more relevance to FIG. 7, when a fault happens, lost objects can be re-computed by applying the same chain of operations as were recorded in a log. In the event that the object is not retained in the staging node, the most recent version available can be retrieved from the file store.

FIG. 7 describes the alternative approach to the regular checkpointing process described in FIG. 6. FIG. 6 may be regarded as a basic embodiment, while FIG. 7 describes another embodiment wherein the checkpointing process can be also done by applying lineage.

The process is very similar to that of FIG. 6, with the difference that it allows updating an already checkpointed object in memory by applying its lineage computation chain (in other words, the sequence of transformations performed on the object since the last time it was checkpointed). Thus, Step 1 includes the RDMA client 270 reading the lineage in addition to the other attributes shown in FIG. 6. The choice between creating a new checkpoint or updating a previous one is made by using the computation time required to create the object (i.e., the time required to create the object in its current state in the computation node). However, this decision is done by the staging node, which uses the attributes sent by the client about the object, and evaluating if re-applying the computation chain to the old object is more efficient than sending the whole object again. Therefore, the client 270 needs to send this computation time as part of the object attributes (Step 2) to the server 750. Steps 3 to 5 are the same as for FIG. 6. If the server decides to update the checkpoint, only the lineage is sent to the server (Step 6), which is able to apply the computation chain that led to the object being checkpointed (Step 7), and therefore, avoid the communication costs of transferring the actual object.

The staging node 700 (in particular the RDMA server 750) is responsible for applying the computation chain. The computation of the transformation being applied to an object requires some computational resources would not be available for the node while the transformation is processed. This could affect the performance of the checkpointing process, if the staging node needs to apply many of these transformations, if these transformations are computationally intense, or if there is a flood of objects to be saved in the staging node. The degree to which the performance will be harmed depends on the hardware of the staging node. The mechanism by which the server decides to checkpoint the object following this approach is later described in FIG. 9.

Figure 8:
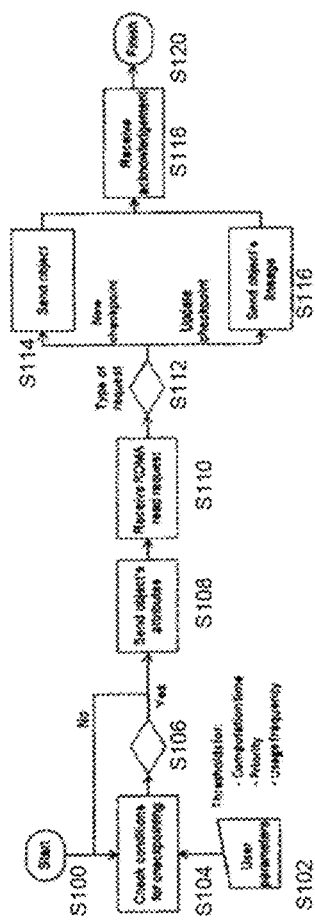
FIG. 8 shows a process workflow performed by a computation node.

To explain the processes of FIGS. 6 and 7 in more detail, FIG. 8 describes the workflow of the client 270 in the computation node 200. The process begins in step S100. In step S102, the user sets any parameters which he or she wishes to be taken into account when the computation node determines whether an object needs to be checkpointed. These parameters can include threshold values for computation time, priority of the object, and/or usage frequency of the object. It will be understood that S102 can be performed in advance of any computation, e.g. during development of the application. Any parameters not set by the user will remain at a default value.

In S104 and S106, the client 270 checks whether the conditions for checkpointing an object are met (this can be checked periodically). If not (S106, No), the process waits until the next check. However, once the conditions are satisfied (S106, Yes), the flow proceeds to S108 in which the client 270 sends attributes of the object to the staging node. In S110, in response to the object attributes, the client 270 receives an RDMA read request from the server 750 in the staging node. As previously described, depending on the type of the request (as judged at S112), the client 270 sends the object to be checkpointed (S114), or only the object's lineage (S116). When the client 270 receives the acknowledgment from the server 750 (S118), its process ends (S120).

Figure 9:
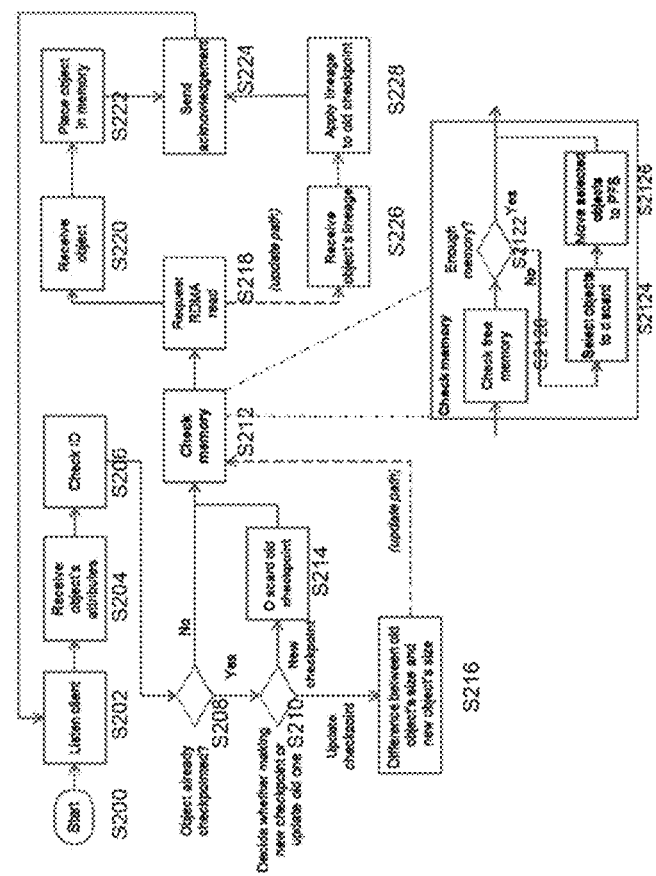
FIG. 9 shows a process workflow performed by a staging node.

FIG. 9 describes the workflow of the server 750 in the staging node 700. The process begins at S200. As a server, it begins listening to the client (S202), until in step S204 the client 270 sends the attributes of the object to be checkpointed, which implies a checkpointing request for that object. Given its ID (S206), the server checks (S208) if the object has been already checkpointed, and if not (S208, No), the server checks (S212) if there is enough memory for the new object.

If a previous state of the same object was checkpointed (S208, Yes), the system decides in step S210 if it is worth creating a new checkpoint, discarding the previous, old version of the object. In order to come to a decision, the server uses the computation time required to create the object, and evaluates whether re-applying the computation chain to the old object is more efficient than sending the whole object again, and hence, the cost of communicating the object is not worthwhile. If it is determined (S210, "Update checkpoint") to perform an update, the difference in size between both the old and the new object is calculated in step S216, and then is used in S212 to check if there is enough memory for the updated version of the object. On the other hand, if it determined to make a new checkpoint, (S210, "New checkpoint") then the server discards the previously-stored object in S214 and the flow again proceeds to S212.

The checking applied by the server in S212, as shown in more detail by steps S2120, S2122, S2124 and S2126, involves the selection of objects to be discarded and moved to the PFS 150 in the case there is not enough memory for the new checkpointed object. This selection is based on a combination of factors, including the priority of the object, how often the object has been used, age of the object and the time requiring for computing that object. Here, "priority" is a user-assignable variable allowing the user adjust the selection of objects relative to one another. This calculation tries to maximize the likelihood of having a certain object in memory if a fault affecting that object occurs.

After the server has freed some memory and ensured that there is enough space for the new object or update, it sends a RDMA read request (S218) to the client 270. This requests the client 270 in the computation node 200 to send either the object itself or the lineage computation chain that leads to the current state of the new object (S218, "update path" in FIG. 9). If the object itself was requested, the server receives the object (S220) and places it in memory (S222). If the lineage was requested, the server receives the lineage in S226 and applies the chain of logged changes to the already checkpointed object in S228.

Finally, once the server has completed the in-memory checkpointing process either by S222 or S228, it sends in S224 an acknowledgment message to the client 270 to confirm the end of the process. A further step (not shown) is to asynchronously write the checkpointed object to the file store 150.

Figure 10:
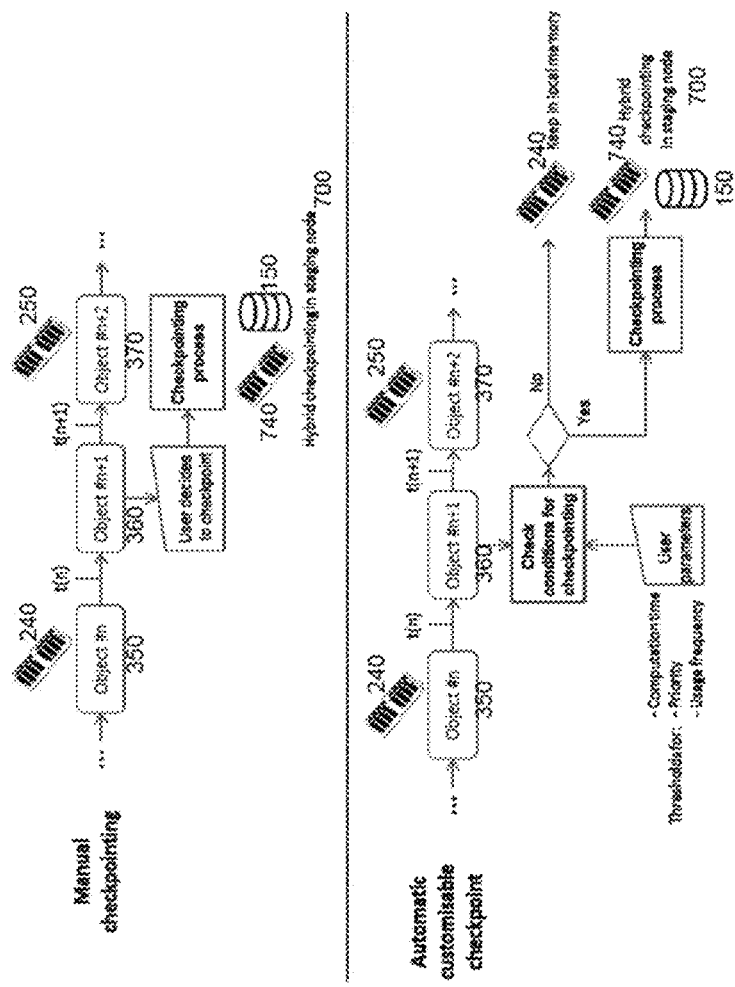
FIG. 10 compares manual and automatic checkpointing.

The checkpointing process above is started either manually or automatically. FIG. 10 shows the differences between these two options. Manual checkpointing (depicted in the upper part of the Figure) is triggered by the user, who decides when and what object is checkpointed. As already mentioned this decision can be made during the development stage of the application. At development time, the user can have a grasp of when the checkpointing should be applied, based on his or her experience both as a programmer and with a particular program: there is no need for the user to monitor progress of the executing the application. When the executed program reaches the stage decided in advance for checkpointing, a checkpoint is triggered. Thus, an object 350 in memory 240 of a computation node may be modified by a transformation t(n) to form an object 360, triggering checkpointing in accordance with an earlier user decision. Checkpointing follows to place the object in memory 740 of staging node 700, upon which processing can resume, with object 360 further transformed by t(n+1) to an object 370 in computation node memory 250. Meanwhile, the staging node can perform asynchronous writing to disk 150.

On the other hand, as shown in the lower part of the Figure, checkpointing may be also automatically started, as long as certain conditions are satisfied. These conditions can also be customised by the user by the above mentioned parameter setting, who can thereby change how the checkpointing mechanism behaves depending on the application. These conditions consist of thresholds for different parameters, such as computation time, priority, and usage frequency. If an object has taken a long time to be computed, it may be worth checkpointing it to avoid its re-computation. In a similar fashion, if the object is heavily used, making a checkpoint may be worthwhile; and the same can be said with high priority objects. Thus, an object 350 in computation node memory 240 becomes transformed by t(n) to object 360. It is then checked whether the conditions for checkpointing are fulfilled: if not, the object is simply maintained in memory 240, but if a need for checkpointing is determined based on the conditions, checkpointing to staging node memory 740 and subsequent backup to the PFS 150 is carried out.

Each staging node 700 is responsible for deciding when the automatic checkpointing is applied. There is a trade-off between performance and safety, expressed as how often checkpointing occurs. If a checkpoint were made after each single instruction, the performance of the program would decrease drastically. The fewer checkpoints are made, the greater the risk of losing some objects, but they can be recovered doing the computation again from the dependent object that was last checkpointed. Of course, if this happens, performance is also affected, but it is compensated because faults do not occur very often.

Figure 11:
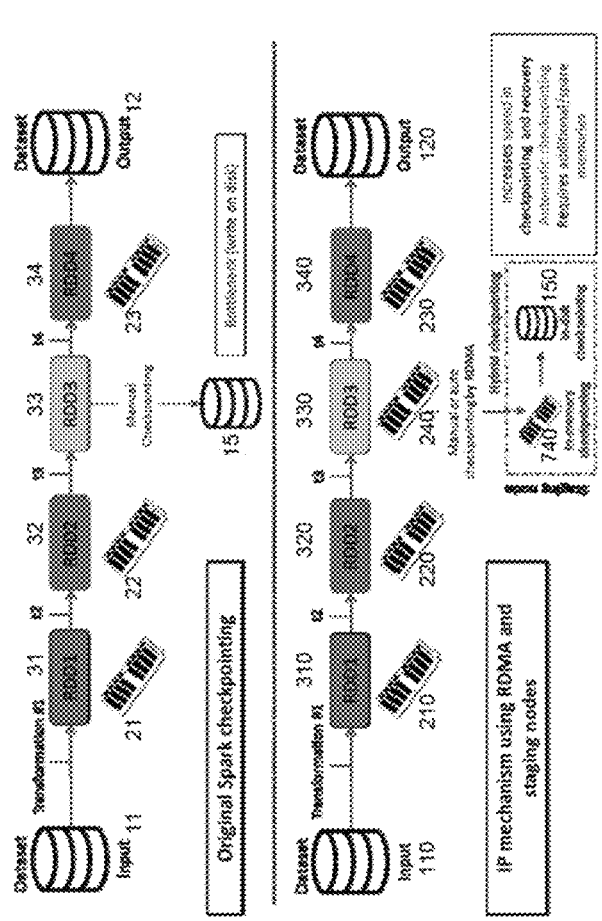
FIG. 11 compares a conventional Spark-based checkpointing mechanism with proposed checkpointing.

To implement the above, an embodiment could be applied as an enhancement of Spark, replacing its mechanism of checkpointing by the one proposed in embodiments, as shown in FIG. 11.

FIG. 11 is conceptually similar to FIG. 3, with file stores 11, 12, 15 and 110, 120 and 150 as before, as well as computation nodes having memories 21, 22, 23 and 210, 220, 230 and 240. A difference now is that each object 31 to 34 or 310 to 340 is a RDD as provided in Spark. As already mentioned, Spark keeps data structures in memory called RDDs (Resilient Distributed Datasets), and thus offers the user the possibility of checkpointing them to disk manually. The upper part of the Figure shows conventional Spark-based checkpointing where writing of RDD3 to file store 15 is performed manually.

The lower part of FIG. 11 represents an embodiment combining RDMA, manual or automatic checkpointing (as discussed above), and in-memory checkpointing in which RDD3 is transferred via RDMA from computation node memory 240 to staging node memory 740, where this RDD is retained even after being written to file store 150. As noted in the Figure, not only the checkpointing itself but also the subsequent recovery, if required, are speedier than the conventional Spark-based approach owing to the superior access speed of memories 240 and 740 particularly when using RDMA. The downside is the need to reserve, or additionally provide, memory resources in the computer system for the use of the staging nodes.

Spark can be modified to implement embodiments of the checkpointing mechanism. Following the described mechanism, RDDs will not be checkpointed directly to disk, thus incurring bottlenecks. On the contrary, RDDs will be transferred using RDMA (and therefore speeding up the communication) to the corresponding staging node, which will keep a copy of the RDDs in-memory, and will transfer them asynchronously to disk. As a result, checkpointing and recovery phases are boosted, thanks to the use of RDMA and the in-memory copy of RDDs in the staging node.

In order to implement this mechanism within Spark, its API is not required to be modified, and therefore, users can keep using the same function to trigger the checkpointing process. For example, if using Scala:

val ssc=new StreamingContext( . . . )//new context
    ssc.checkpoint(checkpointDirectory)//set checkpoint
where checkpoint( ) is the function to make the checkpoint of the corresponding RDD. The only addition needed for the API is a function by which the user could set when the automatic checkpointing mechanism is triggered. This function should be called at the beginning the application, once the context has been created.

What it is necessary to change is the underlying implementation of this function, as well as how Spark is physically deployed in a cluster, because with the application of embodiments, it is necessary to make changes in how the nodes are used and structured, while setting the computation and the staging nodes as shown in FIG. 5.

The automatic mechanism proposed by embodiments should be implemented at a different level within Spark. Spark provides a scheduler as already mentioned. The scheduler is run by the driver, which is a centralised program that is aware of the dependences between the different objects being created. Because of this, it should be the responsibility of Spark's scheduler to perform automatic checkpointing. That is, the scheduler should have the task of monitoring the RDDs, because it is the scheduler which is aware of the size of each RDD, as well as the time required to compute them. With this information, the scheduler should be able to start the checkpointing process, as shown in FIG. 10.

Figure 12:
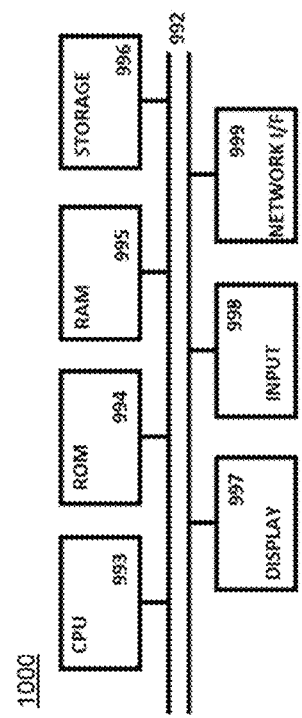
FIG. 12 shows a hardware configuration of a computer system capable of being applied to a computation node and/or a staging node in an embodiment.

FIG. 12 is a block diagram of a computing device 1000 which may be used as a computation node and/or a staging node as referred to above in order to implement a method of an embodiment. The computing device 1000 comprises a computer processing unit (CPU) 993, memory, such as Random Access Memory (RAM) 995, and storage, such as a hard disk, 996. The computing device also includes a network adapter 999 for communication with other such computing devices of embodiments. For example, an embodiment may be composed of a network of such computing devices. Optionally, the computing device also includes Read Only Memory 994, one or more input mechanisms such as keyboard and mouse 998, and a display unit such as one or more monitors 997. The components are connectable to one another via a bus 992. The CPU 993 is configured to control the computing device and execute processing operations. The RAM 995 stores data being read and written by the CPU 993. The storage unit 996 may be, for example, a non-volatile storage unit, and is configured to store data.

The CPU 993 may include one or more general-purpose processing devices such as a microprocessor, central processing unit, or the like. The processor may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor may also include one or more special-purpose processing devices such as an application specific integrated circuit (ASIC), a field programmable gate array (FPGA), a digital signal processor (DSP), network processor, or the like. In one or more embodiments, a processor is configured to execute instructions for performing the operations and steps discussed herein.

The storage unit 996 may include a computer readable medium, which term may refer to a single medium or multiple media (e.g., a centralized or distributed database and/or associated caches and servers) configured to carry computer-executable instructions or have data structures stored thereon. Computer-executable instructions may include, for example, instructions and data accessible by and causing a general purpose computer, special purpose computer, or special purpose processing device (e.g., one or more processors) to perform one or more functions or operations.

Thus, the term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media. By way of example, and not limitation, such computer-readable media may include non-transitory computer-readable storage media, including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices).

The display unit 997 displays a representation of data stored by the computing device and displays a cursor and dialog boxes and screens enabling interaction between a user and the programs and data stored on the computing device. The input mechanisms 998 enable a user to input data and instructions to the computing device.

The network adapter (network I/F) 999 is connected to a network, such as a high-speed LAN or the Internet, and is connectable to other such computing devices via the network. The network adapter 999 controls data input/output from/to other apparatus via the network. Other peripheral devices such as microphone, speakers, printer, power supply unit, fan, case, scanner, trackball etc may be included in the computing device 1000.

Methods may be carried out on a computing device such as that illustrated in FIG. 12. Such a computing device need not have every component illustrated in FIG. 12, and may be composed of a subset of those components. A computation node or staging node may be carried out by a single computing device 1000 in communication with one or more other computing devices via a network. The computing device may be a data storage itself storing at least a portion of the objects. A computation node or staging node may be carried out by a plurality of computing devices operating in cooperation with one another. One or more of the plurality of computing devices may be a data storage server storing at least a portion of the objects.

To summarize, embodiments provide a checkpointing mechanism by which in-memory data structures are copied from computation to staging nodes by using RDMA, checkpoints are made and kept in the staging nodes' memories, and then asynchronously copied to non-volatile storage. In contrast to previous approaches, checkpoints remain in volatile memory as part of the checkpointing mechanism. As a result, recovery from checkpoint is potentially faster, since the required checkpoint may be already in memory in the staging node. An automatic and customisable mechanism is provided to control when the checkpointing process is triggered. As an alternative to copying an object through the network, the object in memory can be updated to a newer version of the object by applying the chain of changes made in the object in the corresponding computation node.

It should be noted that Spark allows performing checkpoints as a complementary measure to lineage recovery. However, checkpoints in Spark are manual and user-guided, while the method described above is transparent and does not need the user to perform the checkpointing. Other novel features in embodiments include:—

A checkpointing mechanism by which in-memory data structures are copied from computation to staging nodes, checkpoints are made and kept in the staging nodes' memories, and then asynchronously copied to non-volatile storage.

The automatic and customisable mechanism that controls when the checkpointing process is triggered.

The mechanism by which a checkpointed object in memory is updated to a newer version of the object by applying the chain of changes made in the object in the corresponding computation node.

The automatic mechanism by which the system decides if an object is checkpointed either copying the object through the network, or applying its lineage computation chain.

The mechanism by which memory in the staging nodes is freed to create space for new checkpoints, using a combination of criteria.

The combined mechanism that allows manual and automatic triggers for the same checkpointing process.

Various modifications are possible within the scope of the embodiments.

Although one sequence of steps has been described in the above embodiment, this is not necessarily the only possible sequence, and operations may be performed in a different order so long as the overall effect is equivalent.

Embodiments can be also applied beyond in-memory data structures, namely, checkpointing techniques involving processes (state of the process, context, memory stack, etc.) can benefit. However, the application of embodiments into this field has involved solving certain technical problems that may arise because of the peculiarities of checkpointing processes, and not strictly data.

The embodiments are particularly applicable to applications having "large granularity", where the same operations are applied in parallel to many data items, such as Big Data applications or HPC in general. Embodiments could also be also applied in scenarios in which finer-level changes are applied. However, if the granularity is finer, the number of operations, and 'objects' which these are applied to would increase, and so the resources needed.

Although an embodiment was described with reference to Spark and RDDs, they are not limited to such use.

In case the embodiments are as an enhancement of Spark, this can be done in various ways. One way is the addition of more commands to the existing Spark package OM option. However, this will require keeping Spark capable of both the conventional mechanism and one discussed herein. Another approach is to modify Spark internals to adapt the new checkpointing mechanism, while modifying existing commands, if necessary, to include the semantics described above.

References above to RDMA are to be understood to include any protocol for interconnecting memories of different nodes without involvement of CPUs and operating systems, including for example RDMA over Converged Ethernet (RoCE) and internet Wide Area RDMA Protocol (iWARP).

INDUSTRIAL APPLICABILITY

Embodiments have application to various fields of computing for improving efficiency of checkpointing. An improvement is provided in terms of speed for checkpointing and recovery processes, because bottlenecks due to writes to disk are eliminated by copying the in-memory data structures from memory to memory.

Communications in checkpointing processes are accelerated thanks to the use of RDMA connections. Communications needed for checkpointing processes are reduced, by applying the lineage computation chain for updating existing checkpoints.

There is an improvement in the usability of checkpointing processes. Since checkpoints are made automatically, users do not need to know when it is the best moment to perform the checkpoint, or even bother about how the checkpoint has to be performed. Moreover, the described mechanism by which the system decides if an object is checkpointed either by copying the object through the network, or applying its lineage computation chain, encapsulates the complexity and hides it from the user, who can focus on the actual application, instead of dealing with the fault tolerant mechanism. Thanks to customisable checkpointing, flexibility is improved: users can change the conditions under which automatic checkpoints are made.

The invention claimed is:

1. A method of checkpointing a data object in a computer system having a computation node, a staging node, and access to a file store, the computation node processing the data object by applying to the data object a lineage computation chain, wherein the lineage computation chain comprises a chain of operations recorded in a log, the method comprising:
   duplicating, in a staging memory of the staging node, the data object from a computation memory of the computation node;
   copying the data object from the computation memory of the computation node to the file store; and
   retaining the data object in the staging memory of the staging node after copying the data object to the file store;
   wherein duplicating the data object comprises updating the data object retained by, in the staging node, applying said lineage computation chain to the data object retained in the staging memory of the staging node to replicate operations applied to the data object in the computation node without reading the data object from the computation memory of the computation node to the staging node.

2. The method according to claim 1, wherein duplicating the object comprises copying the object from the computation memory of the computation node to the staging memory of the staging node.

3. The method according to claim 2, wherein copying the object from the computation memory of the computation node to the staging memory of the staging node is performed using Remote Direct Memory Access, RDMA.

4. The method according to claim 1, further comprising, prior to duplicating the object, selecting whether one of to copy the object from the computation node and to update the object in the staging node.

5. The method according to claim 4, wherein the selecting is performed by calculating whether the staging node applying said computation chain to the object is quicker than reading the object from the computation memory of the computation node.

6. The method according to claim 1, further comprising an initial step of the computation node deciding to checkpoint the object and sending object attributes to the staging node.

7. The method according to claim 6, further comprising the staging node receiving the object attributes from the computation node and, based on the object attributes, selecting whether one of to copy the object from the computation node and to update the object in the staging node.

8. The method according to claim 6, further comprising setting conditions under which the computation node decides to checkpoint the object, including any one or more of:
   computation time of the object,
   priority of the object, and
   usage frequency of the object.

9. The method according to claim 8, further comprising the staging node receiving the object attributes from the computation node and, based on the object attributes, selecting whether one of to copy the object from the computation node and to update the object in the staging node.

10. The method according to claim 1, further comprising, prior to the duplicating, judging whether sufficient space exists in the staging memory of the staging node and when not, creating space in the staging memory.

11. The method according to claim 1, wherein copying the object from the staging memory of the staging node to the file store is performed asynchronously.

12. The method according to claim 1, further comprising, upon occurrence of a fault in the computation node, restoring the object from the staging memory of the staging node to the computation memory of the computation node.

13. The method according to claim 1, wherein the staging memory of the staging node is a volatile memory.

14. A non-transitory computer-readable medium embodying a computer program containing computer-readable instructions which, when executed by processors of one of a computation node and a staging node in a computer system, perform the method according to claim 1.

15. A computer system, comprising:
   a plurality of computation nodes to process data objects by applying to each data object a lineage computation chain, wherein the lineage computation chain comprises a chain of operations recorded in a log;
   a plurality of staging nodes, each staging node assigned to one or more of the computation nodes; and
   a network to exchange data including data objects between the computation nodes and the staging nodes and access a file store;
   wherein a staging node:

duplicates, in a staging memory of the staging node, a data object from a computation memory of a computation node to which the staging node is assigned;
copies the data object from the computation memory of the computation node to the file store; and
retains the data object in the staging memory of the staging node after copying the data object to the file store;
wherein to duplicate the data object, the staging node applies said lineage computation chain to the data object retained in the staging memory of the staging node to replicate operations applied to the data object in the computation node without reading the data object from the computation memory of the computation node to the staging node.

* * * * *